US009114582B2

United States Patent
Blot et al.

(10) Patent No.: US 9,114,582 B2
(45) Date of Patent: Aug. 25, 2015

(54) METHOD FOR PRODUCING A CENTRAL WING BOX

(75) Inventors: Philippe Blot, Nantes (FR); Jerome Colmargo, Toulouse (FR); Denis Soula, Toulouse (FR); Julien Guillemaut, Toulouse (FR); Thomas Le Hetet, La Chevroliere (FR); Dominique Guittard, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 228 days.

(21) Appl. No.: 13/809,112

(22) PCT Filed: Jun. 24, 2011

(86) PCT No.: PCT/FR2011/051467
§ 371 (c)(1),
(2), (4) Date: Jan. 30, 2013

(87) PCT Pub. No.: WO2012/004490
PCT Pub. Date: Jan. 12, 2012

(65) Prior Publication Data
US 2013/0206324 A1 Aug. 15, 2013

(30) Foreign Application Priority Data

Jul. 9, 2010 (FR) .................................... 10 55615

(51) Int. Cl.
*B29D 99/00* (2010.01)
*B29C 70/32* (2006.01)
*B29C 70/44* (2006.01)
*B64C 1/26* (2006.01)
*B64F 5/00* (2006.01)
*B29L 31/30* (2006.01)
*B64C 1/00* (2006.01)

(52) U.S. Cl.
CPC .............. *B29D 99/001* (2013.01); *B29C 70/32* (2013.01); *B29C 70/446* (2013.01); *B64C 1/26* (2013.01); *B64F 5/0009* (2013.01); *B29L 2031/30* (2013.01); *B29L 2031/3082* (2013.01); *B64C 2001/0072* (2013.01); *Y02T 50/433* (2013.01)

(58) Field of Classification Search
CPC .... B29D 99/001; B29C 70/32; B29C 70/446; B64C 1/26; B64F 5/0009
USPC ......... 156/184, 169, 173, 175, 171, 189, 191, 156/192
See application file for complete search history.

(56) References Cited

U.S. PATENT DOCUMENTS 2,337,007 A * 12/1943 Vidal et al. ................ 244/117 R
3,607,504 A * 9/1971 Howard ........................ 156/155
3,962,394 A * 6/1976 Hall ............................. 264/573

(Continued)

FOREIGN PATENT DOCUMENTS

FR 2915173 10/2008
WO 2008054499 5/2008
WO 2008121005 10/2008

*Primary Examiner* — Jeff Aftergut
(74) *Attorney, Agent, or Firm* — Greer, Burns & Crain, Ltd.

(57) ABSTRACT

A method for producing a central wing box having an upper panel, a lower panel, a front spar and a rear spar, the upper edges of said spars approximately parallel to an axis Y being connected by the upper panel, and the lower edges of said spars approximately parallel to the axis Y being connected by the lower panel. The method includes producing at least one panel and at least one spar from composite material in one piece.

9 Claims, 5 Drawing Sheets

(56) References Cited

U.S. PATENT DOCUMENTS

| | | | | |
|---|---|---|---|---|
| 4,849,155 A * | 7/1989 | Penzhorn et al. | | 376/146 |
| 5,190,773 A * | 3/1993 | Damon | | 156/500 |
| 5,223,067 A * | 6/1993 | Hamamoto et al. | | 156/173 |
| 6,190,484 B1 * | 2/2001 | Appa | | 156/189 |
| 6,513,757 B1 * | 2/2003 | Amaoka et al. | | 244/123.7 |
| 6,613,258 B1 * | 9/2003 | Maison et al. | | 264/102 |
| 7,459,048 B2 * | 12/2008 | Pham et al. | | 156/173 |
| 7,824,171 B2 * | 11/2010 | Hanson et al. | | 425/389 |
| 2009/0084899 A1 | 4/2009 | Kismarton et al. | | |
| 2010/0200691 A1 | 8/2010 | Gallant | | |

* cited by examiner

METHOD FOR PRODUCING A CENTRAL WING BOX

BACKGROUND OF THE INVENTION

The present invention relates to a method for producing a central wing box.

As illustrated in FIG. 1, the structure of an aircraft comprises two sub-assemblies, on the one hand a fuselage 10, and on the other hand a wing 12, that are linked by means of a box structure 14 known as a central wing box.

As illustrated in FIG. 2, the central wing box 14 comprises on the one hand two panels, an upper panel 16 and a lower panel 18, and on the other hand, a minimum of two spars, a front spar 20 and a rear spar 22.

In a known manner, these four elements are produced separately and then connected to one another, using intermediate parts 24 such as angle members, as illustrated in FIGS. 2, 3A and 3B and/or via lightweight extensions 26 at the level of the panels or spars of the edge flange type, as illustrated in FIGS. 3B and 3C.

In all cases it is necessary to provide at least two joints per spar, i.e. at least four joints for the central wing box 14.

In the case of metal parts, each joint necessitates a phase of positioning of the two elements to be assembled, a pre-assembly phase, for example by pinning, a drilling/boring phase, a phase of cleaning off swarf, and a phase of riveting several rows for fixing.

These operations are long and have a significant impact on the cost of the box.

In the case of panels and spars made of composite material, the production method comprises the same steps as for metal elements, but the drilling phase is even longer and more difficult because of the risks of flaking.

According to another problem linked to the composite material, the gap between the parts to be assembled should be less than 3/10 mm in order to obtain a contact between the parts enabling them to be assembled without residual bending stresses. This stress necessitates perfect control of the methods of manufacture of the parts to be assembled, in particular in the region of contact surfaces.

However, it is quite often necessary to provide an additional step consisting of interposing a wedging resin between the two parts to be assembled in order to be within the contact tolerance.

This operation is long since after the resin has been deposited the parts must be assembled temporarily in order to calibrate the thickness of the resin, then disassembled for drying of the resin. The final assembly is performed only after the drying of the resin.

According to another point, at the edges of the parts to be assembled, assembly by riveting generates substantial local stresses that necessitate extra thicknesses. In the case of composite material, these extra thicknesses are more substantial since the orientations of the fiber reinforcements must be optimal. Of course, these extra thicknesses increase the payload.

SUMMARY OF THE INVENTION

Also, the present invention seeks to remedy the drawbacks of the prior art by proposing a method of production of a wing box made of composite material that makes it possible to reduce the manufacturing time.

According to another objective, the invention relates to limiting the defects in relation to the external surface of the central wing box.

To this end, the invention relates to a method for producing a central wing box having an upper panel, a lower panel, a front spar and a rear spar, the upper edges of said spars approximately parallel to an axis Y being connected by the upper panel, and the lower edges of said spars approximately parallel to the axis Y being connected by the lower panel, characterized in that it consists of producing at least one panel and at least one spar from composite material in one piece.

BRIEF DESCRIPTION OF THE DRAWINGS

Other characteristics and advantages will become apparent from the following description of the invention, given purely by way of example, with regard to the appended drawings in which.

DETAILED DESCRIPTION OF THE PREFERRED EMBODIMENTS

For the rest of the description, it is considered that the longitudinal axis (also known as axis X) corresponds to the axis that extends from the front tip to the tail cone of the aircraft. A transverse plane corresponds to a plane perpendicular to the longitudinal axis that comprises the axis Y (horizontal when the aircraft is on the ground) and the axis Z (vertical when the aircraft is on the ground).

Figure 8:
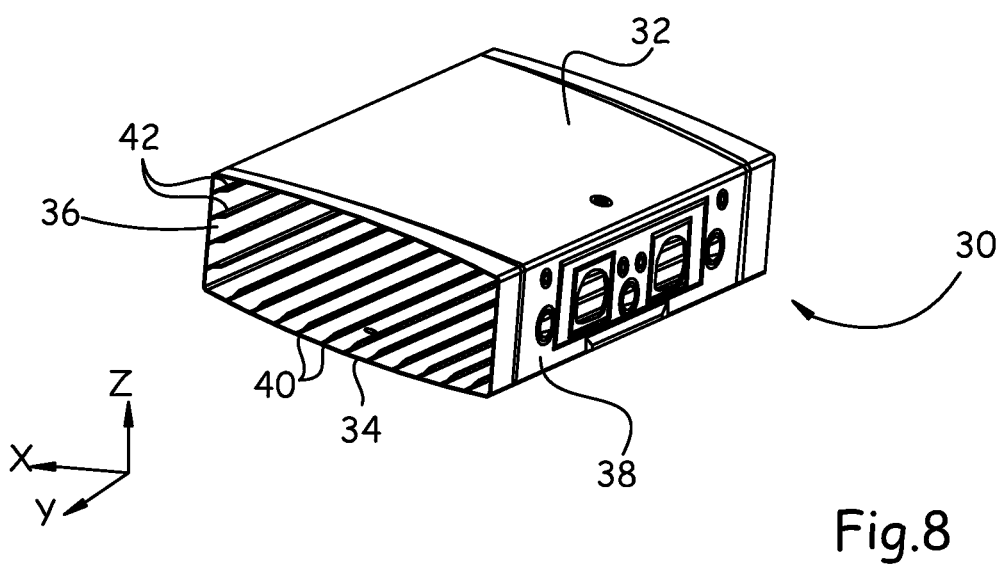
FIG. 8 shows a perspective view of another embodiment of a central wing box invention.

As illustrated in FIG. 8, the central wing box 30 includes an upper panel 32, a lower panel 34, a front spar 36 and a rear spar 38. The spars 36 and 38 are substantially planar and are disposed approximately in transverse planes. These spars are spaced and their upper edges that are approximately parallel to the axis Y are connected by the upper panel 32 whilst their lower edges that are approximately parallel to the axis Y are connected by the lower panel 34.

The panels 32 and 34 are not generally planar but are slightly convex.

The axis of the box corresponds to the axis Y. An internal surface of a spar or of a panel corresponds to the surface of said panel or of said spar oriented towards the other panel or spar, the external surface being the surface opposed to the internal surface.

The panels and the spars are not loaded in the same manner. Thus the panels 32 and 34 withstand compressive and tensile forces along the Y axis and flexural forces in a plane XZ.

In order to take up these loads, the panels 32, 34 comprise stiffeners 40 parallel to the axis Y in the region of their internal surfaces.

The spars are subjected to compressive and tensile forces along the Y axis and shear forces in a direction contained in a plane XZ.

Advantageously, in the region of their internal surfaces the spars 36, 38 comprise stiffeners 42 parallel to the axis Y.

According to the invention, the central wing box 30 comprises at least one panel and at least one spar produced from composite material in one piece.

Figure 1:
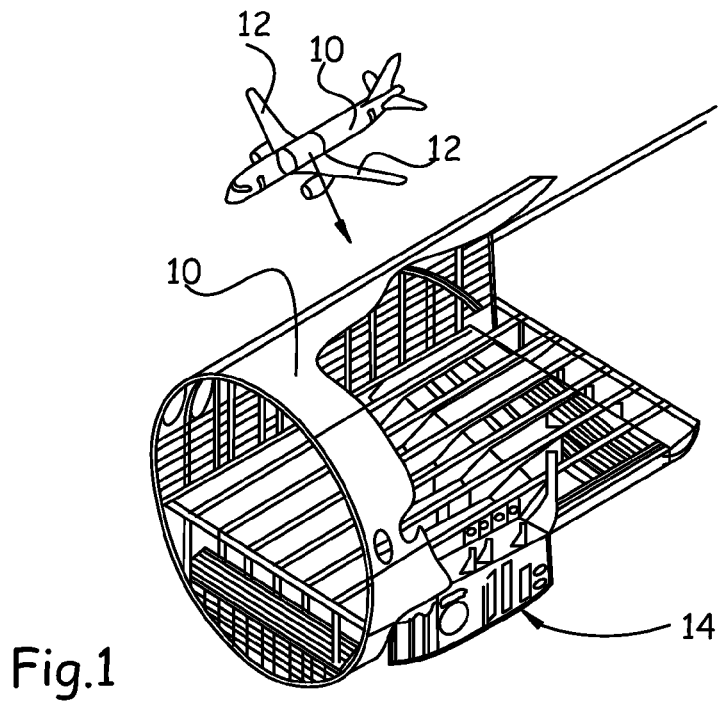
FIG. 1 shows an perspective view illustrating a central section of an aircraft.
Figure 2:
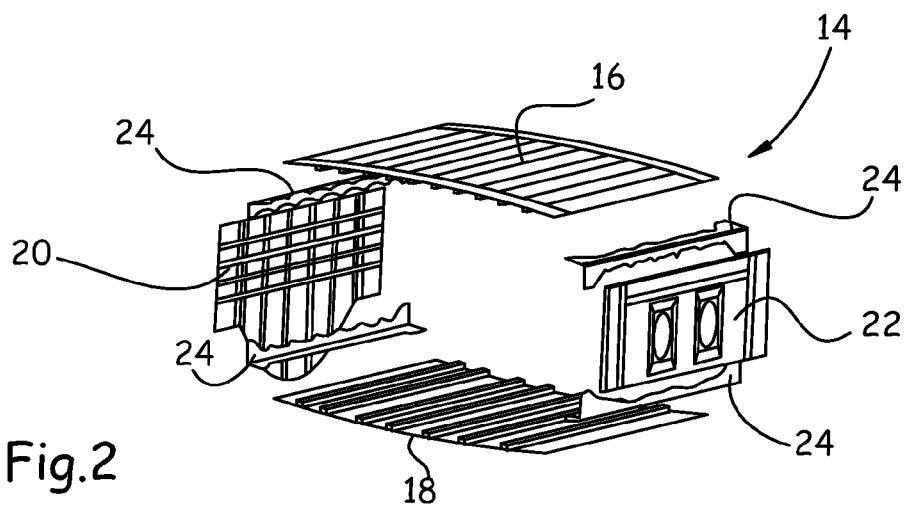
FIG. 2 shows a perspective view of a central wing box according to the prior art.
Figures 3A, 3B, 3C:
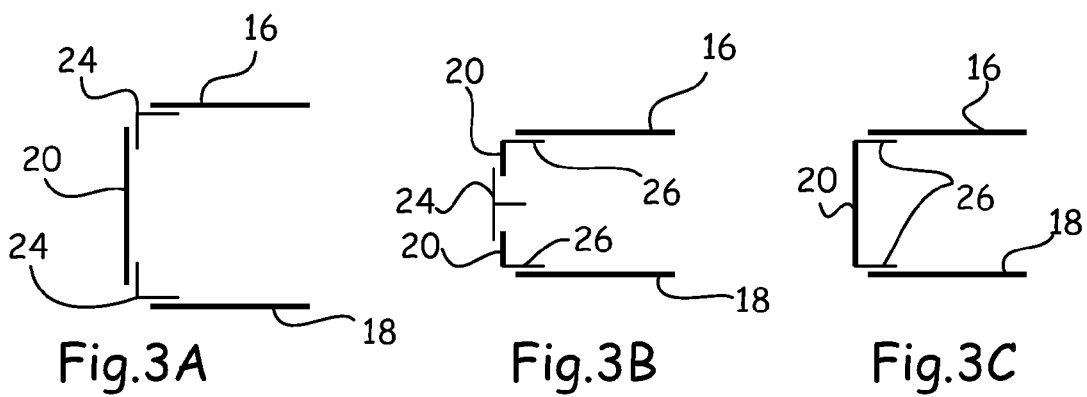
FIGS. 3A to 3C are diagrams illustrating different embodiments for assembly according to the prior art.
Figure 4:
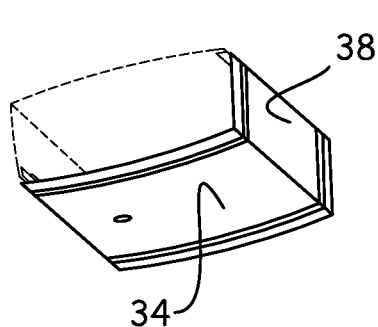
FIG. 4 shows a perspective view illustrating the exterior of a part of a central wing box according to an embodiment of the invention.
Figure 5:
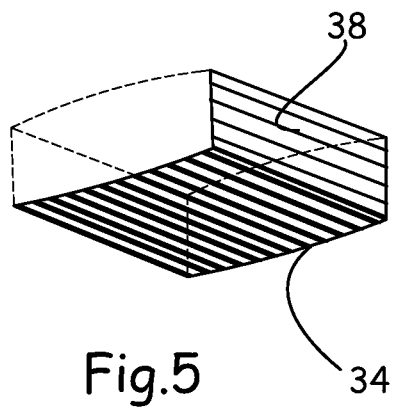
FIG. 5 shows a perspective view illustrating the interior of the part of the central wing box according to FIG. 4.

According to an embodiment illustrated in FIGS. 4 and 5, the central wing box 30 comprises two sub-assemblies each having a panel and a spar produced in one piece from composite material, the two sub-assemblies being connected to one another by two interfaces. Thus, the spar of the first sub-assembly is connected by an interface to the panel of the second sub-assembly whilst the spar of the second sub-assembly is connected by an interface to the panel of the first sub-assembly. Depending upon the case, an interface may take the form of a separate element such as for example an angle member or may take the form of an element incorporated into the spar or into the panel as for example an edge flange.

According to one mode of operation, the two sub-assemblies are obtained from dry preforms disposed in a mold into which a liquid resin is injected, the whole then being at least partially polymerized. According to a first embodiment, the two sub-assemblies are totally polymerized independently of another then are assembled with the same interfaces as the prior art. According to another embodiment, the two sub-assemblies are partially polymerized, then are assembled in the half-baked state before being totally polymerized. This assembly can be produced on a mandrel with a winding of complementary fiber reinforcements as will be detailed later.

Thus, according to the invention each spar comprises at most one interface. This solution makes it possible to reduce the assembly time taking into account the reduction in the number of parts to be assembled.

According to this embodiment, the stiffeners 42 can be disposed on the external surfaces of the spars.

Figure 6:
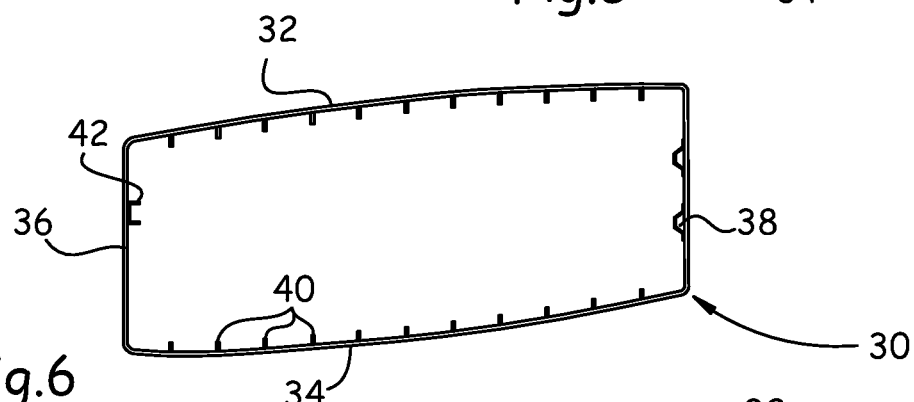
FIG. 6 shows a front view of a central wing box according to another embodiment of the invention.

According to a preferred embodiment illustrated in FIGS. 6 and 8, the central wing box 30 is produced in one piece.

This solution has the advantage of eliminating all the interfaces and therefore of further reducing the assembly time since the spars do not comprise any interface.

Figure 7:
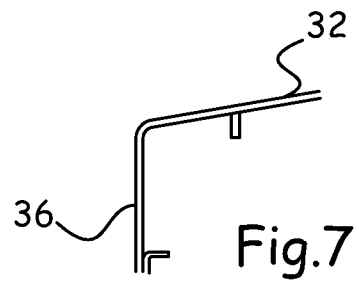
FIG. 7 shows a perspective view illustrating in detail a zone connecting a panel and a spar of the central wing box according to FIG. 6.

According to another aspect, this solution also has the advantage of reducing the payload, by not including any overlap zone (as illustrated in FIG. 7) in order to ensure the joint between two elements as in the case of an edge flange or by not providing any zones of extra thickness necessary for taking up the local forces in the case of fixing means such as rivets.

According to one characteristic of the invention, the central wing box 30 is obtained by wrapping of at least one fiber reinforcement 44 about the axis Y (corresponding to the axis of the box) on a mandrel 46.

The wrapping derives from a relative rotational movement about the axis Y between the mandrel 46 and the means for depositing said fiber reinforcement 44. Depending upon the case, the mandrel can pivot about the axis Y and/or the depositing means can pivot about the axis Y.

"Fiber reinforcement" is understood to mean at least one fiber, one assembly of fibers or one or several mini-sheets of fibers (with a width less than 15 mm).

By way of example, in the course of the operation for deposition on the mandrel several fiber reinforcements are deposited simultaneously (up to 32 for example). As these fiber reinforcements are independent of one another, it is possible to deposit them on surfaces with a dual radius of curvature.

"Wrapping" is understood to mean that the fiber reinforcement 44 extends over at least one spar and one panel and along a direction contained in a plane secant to the axis Y.

The production of the central box may derive from the deposition of sheets of fibers and/or the deposition of fiber reinforcements along the axis Y and the winding of fiber reinforcements 44 about the axis Y.

Depending upon the case, the sheets and the fiber reinforcements may be dry or pre-impregnated.

In order to ensure that the forces are taken up, with regard to the panels, the fiber reinforcements will be oriented for the most part parallel to the axis Y. With regard to the spars, they will be oriented to some extent parallel to the axis Y and to some extent according to the orientations at +/−45° in order to withstand the shear stresses.

Fiber reinforcements along a direction contained in a plane secant to the axis Y are provided in order to ensure the cohesion of the panels and the spars.

Certain plies along the direction of the axis Y in the region of the panels could be stopped and replaced in the region of spars by plies having other directions.

However, the reinforcements with directions in planes secant to the axis Y will be predominantly continuous in order to ensure the resistance and the cohesion of the central wing box.

Figure 12:
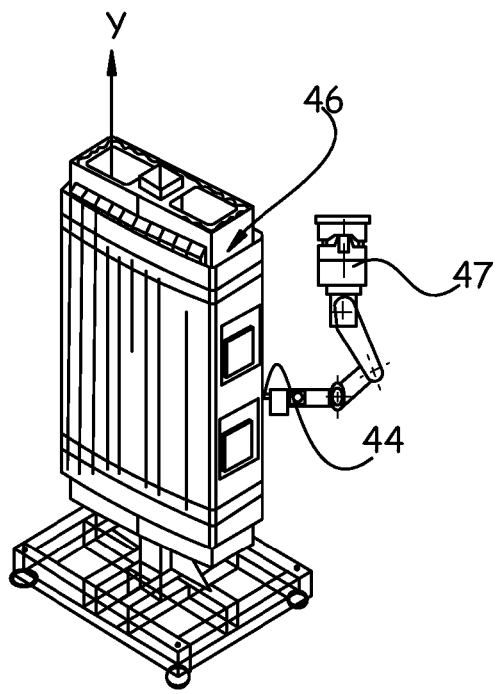
FIG. 12 shows a perspective view of a device that ensures the placing of fiber reinforcements on a mandrel in such a way as to obtain a central wing box according to the invention.

For the production and the deposition of fibrous elements, a machine can be used for the deposition of strips, in particular for deposition along the axis Y and/or a machine 47 (visible in FIG. 12) can be used for the deposition of fibers, in particular for wrapping around the mandrel in directions in planes secant to the axis Y, for example at 90° and at +/−45°.

As a embodiment, a machine can be used for the deposition of heavyweight fibers, in particular in the direction Y, and a machine can be used for the deposition of lightweight fibers, in particular for wrapping around the mandrel in directions in planes secant to the axis Y, for example at 90° and at +/−45°.

The mandrel 46 has shapes in order to structure the internal surface of the central wing box.

Figure 9:
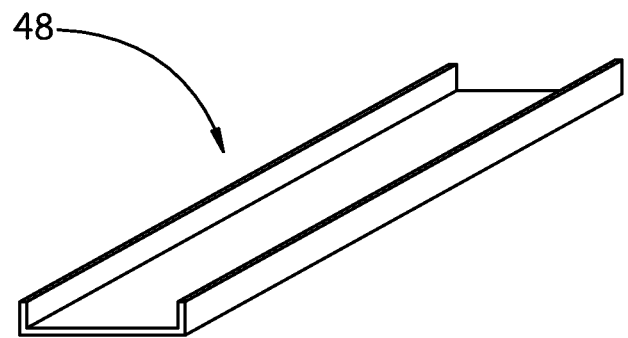
FIG. 9 shows a perspective view of a stiffener intended for a central wing box according to the embodiment illustrated in FIG. 8.
Figure 10:
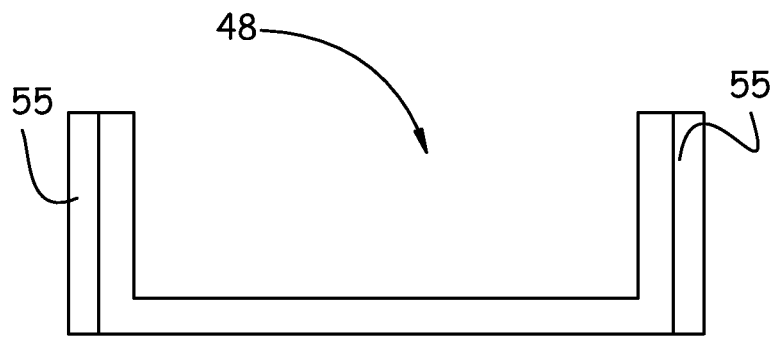
FIG. 10 is a cross-section of the stiffener of FIG. 9.
Figure 11:
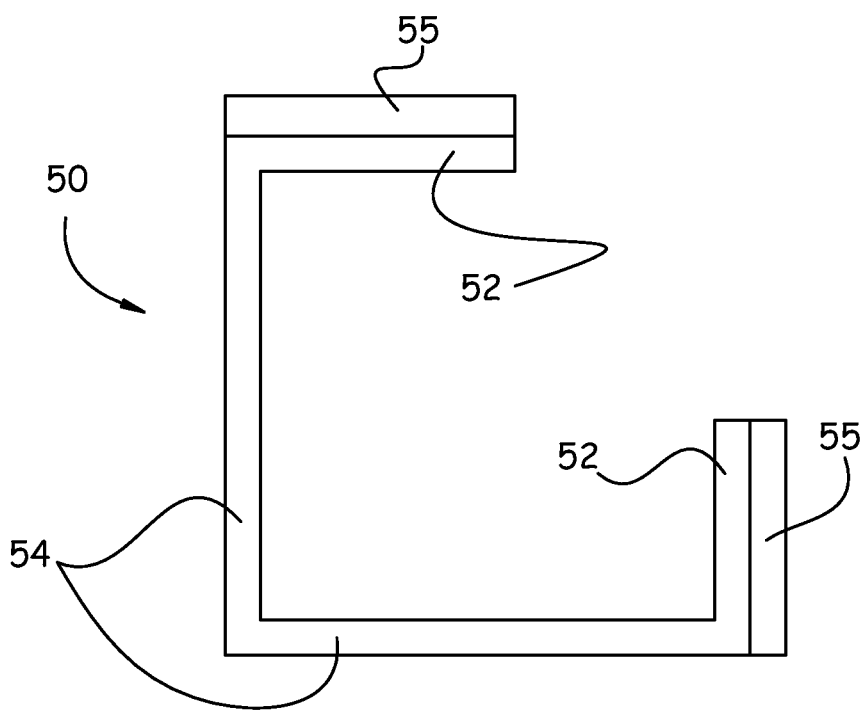
FIG. 11 shows a cross section of an angled stiffener intended for a central wing box according to the embodiment illustrated in FIG. 8.

According to an embodiment illustrated in FIGS. 9 to 11, the stiffeners 40 and 42 are produced from profiles 48 with a U-shaped cross-section with two arms and a base capable of being placed flat against the internal surface of a panel or of a spar. The profiles are attached to one another in such a way that the two attached arms of two adjacent profiles form a stiffener.

The stiffeners close to the zones connecting a panel and a spar can be obtained from a profile 50, illustrated in FIG. 11, that comprises two arms 52 connected by an L-shaped base 54.

An element known as a nail head may be disposed at the gap that appears when two profiles 48, 50 are attached.

FIGS. 10 and 11 shows stiffeners with nail half-heads 55 on either side.

Figure 13:
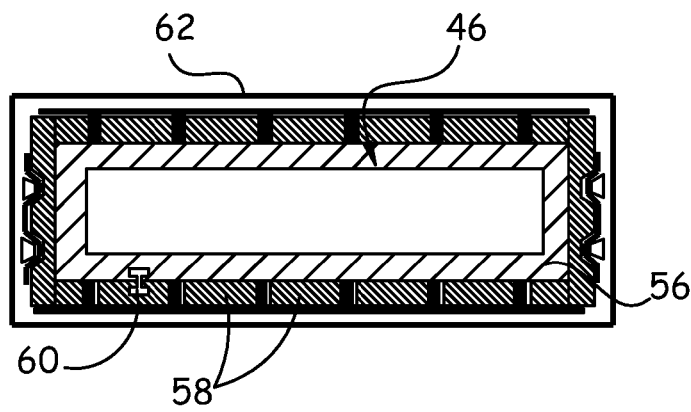
FIG. 13 shows a cross-section of a mandrel for the production of a central wing box according to the invention.

When the central wing box comprises stiffeners 40 and 42 parallel to the axis Y, the mandrel 46 advantageously comprises several parts, a main mandrel 56 and removable parts known hereafter as removable mandrels 58, as illustrated in FIG. 13. The removable mandrels are held on the main mandrel by any appropriate means, for example fixing keys 60.

According to one mode of operation, the profiles can be obtained from composite materials with a thermoplastic matrix if the connection (by welding or gluing for example) is controlled between the stiffeners and the panels or the spars.

According to another mode of operation, the profiles 48, 50 may be produced from pre-impregnated fibrous material and are draped over the removable mandrels 58. Advantageously, the profiles 48, 50 are partially polymerized in such a way as to limit the subsequent dimensional variations of the said profiles 48, 50.

Then the removable mandrels 58 on which the profiles 48, 50 are disposed are attached to the main mandrel 56. Finally, the fiber reinforcements forming the panels and the stiffeners are draped and wrapped directly on the stiffeners 48 and 50.

After the deposition of the fibrous elements, the assembly is covered by drainage system and by a leakproof sleeve known also referred to as a bladder 62.

Advantageously, the main mandrel 56 is leakproof and has a length greater than that of the central wing box and extends on either side of this latter in such a way as to offer a surface on either side for contact with the bladder 62. This arrangement makes it possible to reduce the risk of leaks and consequently of having a defective material after polymerization.

According to a first embodiment, the profiles, the spars and the panels are produced from pre-impregnated fibrous elements.

According to another embodiment, they are produced from dry fibrous elements. In this case a resin is injected or infused into the space delimited by the leakproof main mandrel 56 and the bladder 62.

Figure 14:
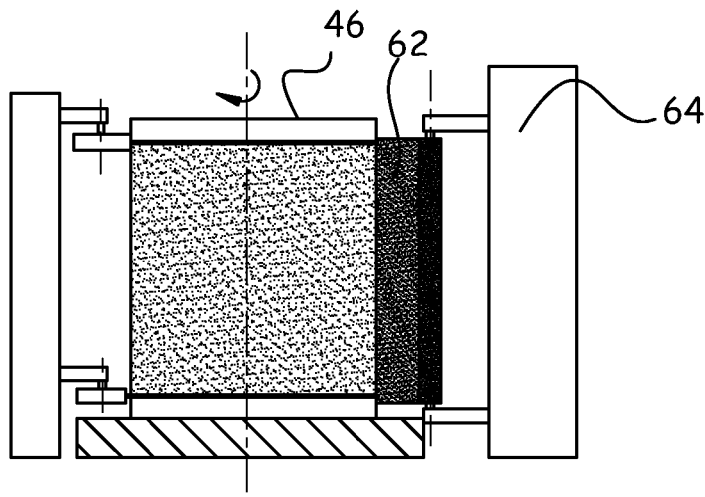
FIG. 14 shows a lateral view illustrating a device enabling the positioning of a leakproof sleeve on a mandrel.

The bladder 62 can be attached with the aid of a depositing head 64, illustrated in FIG. 14, that makes it possible to wrap the bladder 62 onto the assembly consisting of the main mandrel, the removable mandrels, the stiffeners, the panels and the spars.

Finally, this assembly is subjected to a cycle of polymerization in order to ensure the consolidation of the central wing box.

This mode of operation makes it possible to obtain a very good geometry on the internal surfaces of the central wing box that facilitates the operations for assembly of the elements that are connected in the region of the said internal surfaces, such as connecting rods for example.

According to one embodiment, the mandrels 56 and 58 are metal or made from a similar material in such a way that the thermal shrinkage of the mandrels 56 and 58 after polymerization assists the demolding.

The possible extra thicknesses are provided in the region of the external surfaces in such a way that the mandrels are smooth and assist the demolding.

Advantageously, smoothing plates are disposed between the elements forming the central box and the bladder 62 in order to ensure efficient compacting.

According to another characteristic of the invention, at least one smoothing plate comprises at least two parts connected by an articulated joint permitting a relative rotary movement between the said two parts along an axis of rotation parallel to the axis Y. This configuration makes it possible to exert a constant pressure in the region of the radius of curvature connecting a panel and a spar.

This articulated joint may be a hinge or may result from the flexibility of the material of the smoothing plate in the region of the articulated joint.

In the region of at least one radius of curvature connecting a panel and a spar, the mandrel 46 comprises means 66 for expanding it in the region of at least one radius of curvature in such a way as to increase the perimeter of the said mandrel during compacting of the fiber reinforcements constituting the central wing box.

Figure 15:
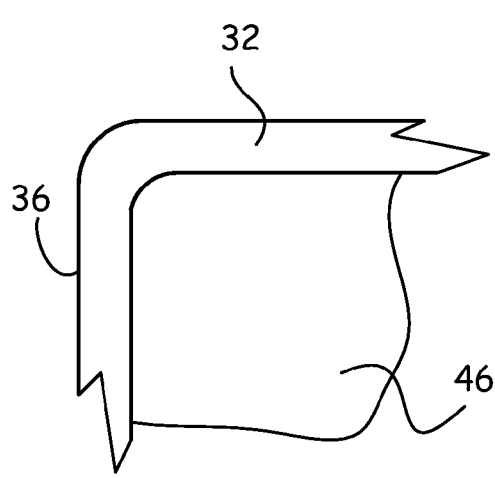
FIG. 15 shows a cross-section of a zone connecting a panel and a spar of a central wing box before compacting of the fiber reinforcements.

FIG. 15 shows a part of a preform of fiber reinforcements in the region of a zone connecting a panel and a spar before compacting.

Figure 16:
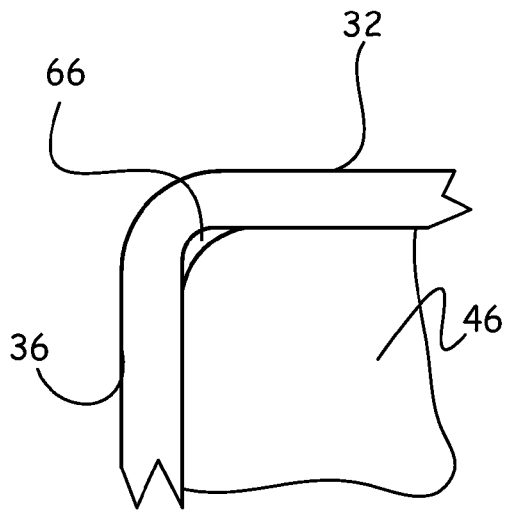
FIG. 16 shows a cross-section of the corner of FIG. 15 after the compacting.

FIG. 16 shows the same part after compacting, the mandrel 46 being expanded in the region of the radius of curvature. This arrangement makes it possible to limit the appearance of undulations likely to affect the mechanical characteristics of the box in the region of the radius of curvature during compacting.

According to one embodiment, the means 66 for expansion of the mandrel may be present in the form of an inflatable bladder interposed between the mandrel and the fiber reinforcements. However, other solutions may be envisaged in order to obtain the expansion of the mandrel in the region of a radius of curvature or the radii of curvature.

According to another characteristic of the invention, the fiber reinforcements 44 disposed at 90° relative to the axis Y are cut near to a zone connecting a panel and a spar. In so far as the fiber reinforcements are inextensible, this arrangement makes it possible to avoid blocking the dilation or the expansion of the mandrel.

Figure 17:
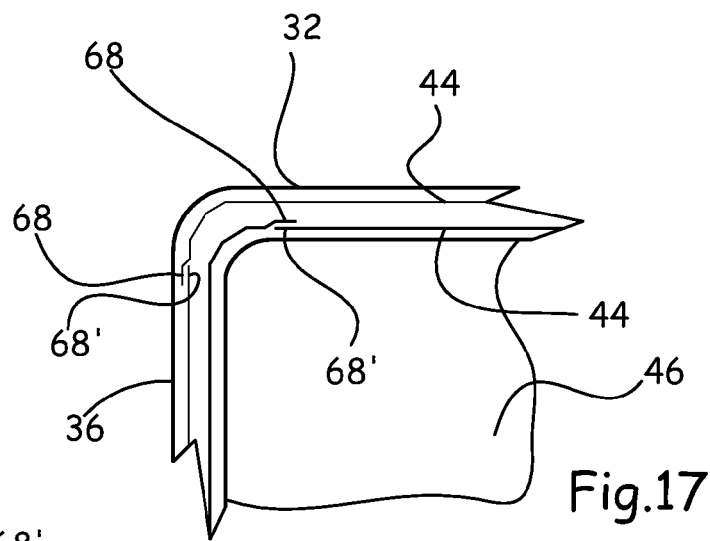
FIG. 17 shows a cross-section illustrating the arrangement of the fiber reinforcements in the region of zone connecting a panel and a spar of a central wing box before the compacting.

Advantageously, the portions 68, 68' of a fiber reinforcement disposed on either side of a cut 70 are superimposed during the positioning of the said fiber reinforcement as illustrated in FIG. 17. The length of the superimposition is adjusted in such a way that, after compacting, the expansion of the mandrel and the deformation of the radius of curvature, the portions 68, 68' are again positioned end to end, as illustrated in FIG. 18, with an acceptable spacing.

Figure 18:
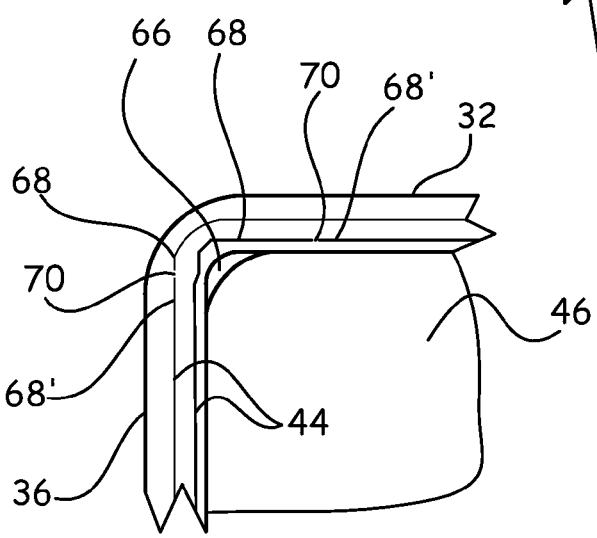
FIG. 18 shows a cross-section illustrating the arrangement of the fiber reinforcements in the region of zone connecting a panel and a spar of a central wing box after the compacting.

In the region of a radius of curvature, the superimpositions are offset from one ply to the other in such a way as to distribute the cuts 70 in order to avoid a localized weakening in the structure of the central wing box as illustrated in the FIGS. 17 and 18.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for producing a central wing box having an upper panel, a lower panel, a front spar and a rear spar, the upper edges of said spars approximately parallel to an axis Y being connected by the upper panel, and the lower edges of said spars approximately parallel to the axis Y being connected by the lower panel, comprising the step:

producing at least one panel and at least one spar from composite material in one piece;

wherein the central wing box is produced by wrapping of at least one fiber reinforcement about the axis Y on a mandrel, the said central box having stiffeners parallel to the axis Y in the region of the internal surfaces, including the further steps of depositing fiber reinforcements on removable mandrels in such a way as to obtain a U-shaped profile for each removable mandrel, joining the removable mandrels onto a main mandrel by attaching the U-shaped profiles in such a way that the two arms of two adjacent U-shaped profiles form a stiffener, wherein when the removable mandrels are joined to the main mandrel the removable mandrels protrude outwardly from an exterior surface of the main mandrel, wherein the removable mandrel is only in direct contact with the main mandrel at a surface of attachment to the main mandrel, then wrapping at least one fiber reinforcement around the axis Y;

wherein the mandrel is leakproof and extends on either side of the wing box in such a way as to offer a surface on either side for contact with a leakproof space that makes it possible to define a hermetically sealed space with the mandrel; and including the steps of disposing between the fibrous elements forming the central wing box and a bladder at least one smoothing plate comprising at least two parts connected by an articulated joint permitting a relative rotary movement between the said two parts along an axis of rotation parallel to the axis Y.

2. The method for producing a central wing box as claimed in claim 1, wherein the two panels and the two spars are produced in one piece.

3. The method for producing a central wing box as claimed in claim 1, wherein the mandrel comprises means for expanding it in a region of at least one radius of curvature in such a way as to increase a perimeter of the said mandrel during compacting of the fiber reinforcements constituting the central wing box.

4. The method for producing a central wing box as claimed in claim 1 further comprising attaching the removable mandrels to the main mandrel with a fixing key.

5. A method for producing a central wing box having an upper panel, a lower panel, a front spar and a rear spar, the upper edges of said spars approximately parallel to an axis Y being connected by the upper panel, and the lower edges of said spars approximately parallel to the axis Y being connected by the lower panel, comprising the step:

producing at least one panel and at least one spar from composite material in one piece;

wherein the central wing box is produced by wrapping of at least one fiber reinforcement about the axis Y on a mandrel, the said central box having stiffeners parallel to the axis Y in the region of the internal surfaces, including the further steps of depositing fiber reinforcements on removable mandrels in such a way as to obtain a U-shaped profile for each removable mandrel, joining the removable mandrels onto a main mandrel by attaching the U-shaped profiles in such a way that the two arms of two adjacent U-shaped profiles form a stiffener, wherein when the removable mandrels are joined to the main mandrel the removable mandrels protrude outwardly from an exterior surface of the main mandrel, wherein the removable mandrel is only in direct contact with the main mandrel at a surface of attachment to the main mandrel, then wrapping at least one fiber reinforcement around the axis Y;

wherein the fiber reinforcements disposed at 90° relative to the axis Y are cut near to a zone connecting a panel and a spar; and wherein a portion of a fiber reinforcement disposed on either side of a cut are superimposed during the positioning of the said fiber reinforcement, the length of the superimposition being adjusted in such a way that, after compacting, the portions are again positioned end to end.

6. The method for producing a central wing box as claimed in claim 5, wherein in a region of a radius of curvature, the superimpositions are offset from one ply to the other in such a way as to distribute the cuts.

7. A method for producing a central wing box having an upper panel, a lower panel, a front spar and a rear spar, the upper edges of said spars approximately parallel to an axis Y being connected by the upper panel, and the lower edges of said spars approximately parallel to the axis Y being connected by the lower panel, comprising the step:

producing at least one panel and at least one spar from composite material in one piece;

wherein the central wing box is produced by wrapping of at least one fiber reinforcement about the axis Y on a mandrel;

wherein the mandrel is leakproof and extends on either side of the wing box in such a way as to offer a surface on either side for contact with a leakproof space that makes it possible to define a hermetically sealed space with the mandrel; and disposing between the fibrous elements forming the central wing box and a bladder at least one smoothing plate comprising at least two parts connected by an articulated joint permitting a relative rotary movement between the said two parts along an axis of rotation parallel to the axis Y.

8. A method for producing a central wing box having an upper panel, a lower panel, a front spar and a rear spar, the upper edges of said spars approximately parallel to an axis Y being connected by the upper panel, and the lower edges of said spars approximately parallel to the axis Y being connected by the lower panel, comprising the step:

producing at least one panel and at least one spar from composite material in one piece;

wherein the central wing box is produced by wrapping of at least one fiber reinforcement about the axis Y on a mandrel;

wherein the fiber reinforcements disposed at 90° relative to the axis Y are cut near to a zone connecting a panel and a spar; and wherein a portion of a fiber reinforcement disposed on either side of a cut are superimposed during the positioning of the said fiber reinforcement, the length of the superimposition being adjusted in such a way that, after compacting, the portions are again positioned end to end.

9. The method for producing a central wing box as claimed in claim 8, wherein in a region of a radius of curvature, the superimpositions are offset from one ply to the other in such a way as to distribute the cuts.

* * * * *